UNITED STATES PATENT OFFICE.

ABRAHAM GESNER, OF NEW YORK, N. Y., ASSIGNOR, BY MESNE ASSIGNMENTS, TO NORTH AMERICAN KEROSENE GAS LIGHT COMPANY.

IMPROVEMENT IN BURNING-FLUIDS.

Specification forming part of Letters Patent No. 12,936, dated May 22, 1855.

*To all whom it may concern:*

Be it known that I, ABRAHAM GESNER, late of the city and county of New York, now of Williamsburg, in the county of Kings and State of New York, have invented and discovered a new and useful Burning-Fluid for Artificial Illumination; and I do hereby declare that the following is a full, clear, and exact description of the manner of making and using the same.

This burning-fluid is a compound of alcohol (which I prefer of specific gravity .844, at a temperature of 60° Fahrenheit; but I do not confine myself to this proof or strength) and the new liquid hydrocarbon which I call "kerosene," and which is fully described in the specification of a contemporaneous application for Letters Patent which I have made.

I take what in my said specification I denominate the "first and second proof" kerosene, or "A" kerosene and "B" kerosene, (the "C" kerosene described in said specification being unsuitable for this purpose,) and mix as much of either with the alcohol as the latter will dissolve. Thirty-five parts, by measure, of the "A" kerosene require sixty-five parts, by measure, of the alcohol of the strength above mentioned to dissolve it, and twenty-five parts of the "B" kerosene requires seventy-five parts of this alcohol to dissolve it. If the "A" and "B" kerosene are mixed together, a sufficient quantity of alcohol to dissolve them must be added. The burning-fluid thus composed of the "A" and "B" kerosene and alcohol will contain between sixty-five and seventy-five per cent. of the alcohol. The exact proportions of the alcohol and the kerosene above mentioned will not under all circumstances be the best, as variations in either the quality of the kerosene or the strength or quality of the alcohol will render a corresponding variation in the relative quantity of the two in the mixture necessary, the rule in all cases for producing the best burning-fluid being to saturate the alcohol with the kerosene without excess, when the mixture will burn in a proper lamp without smoke. After the alcohol and kerosene have been mixed the mixture may be distilled through a common still, in order to unite the ingredients more intimately; but if they are simply mixed while warm the resulting burning-fluid will be of satisfactory quality. The latter is the mode in which I have practiced the preparation of the burning-fluid.

The burning-fluid thus prepared will readily burn in a spirit, gas, or wick lamp, or in a phosgene-lamp, giving a brilliant, white, and agreeable light.

I claim—

As a new manufacture or composition of matter, the burning-fluid composed of alcohol and "A" kerosene, as herein specified.

In testimony whereof I have hereunto subscribed my name.

ABRAHAM GESNER.

Witnesses:
P. H. WATSON,
PETER HANNAY.